US009195365B2

(12) United States Patent
Williams

(10) Patent No.: US 9,195,365 B2
(45) Date of Patent: Nov. 24, 2015

(54) AUTOMATIC CONFIGURATOR OF DISPLAY OBJECTS

(75) Inventor: Eric Williams, Tallmadge, OH (US)

(73) Assignee: Honeywell International Inc., Morristown, NJ (US)

( * ) Notice: Subject to any disclaimer, the term of this patent is extended or adjusted under 35 U.S.C. 154(b) by 1165 days.

(21) Appl. No.: 12/411,134

(22) Filed: Mar. 25, 2009

(65) Prior Publication Data

US 2010/0251146 A1    Sep. 30, 2010

(51) Int. Cl.
    G06F 3/0481    (2013.01)
    G06F 3/0488    (2013.01)
    G06F 9/44      (2006.01)

(52) U.S. Cl.
    CPC ........ G06F 3/04817 (2013.01); G06F 3/04886 (2013.01); G06F 9/4443 (2013.01)

(58) Field of Classification Search
    CPC ...... G06F 3/0481; G06F 3/0482; H04L 41/22
    USPC ......... 715/841, 853, 854, 817, 818, 819, 820, 715/829
    See application file for complete search history.

(56) References Cited

U.S. PATENT DOCUMENTS

| | | | | |
|---|---|---|---|---|
| 5,297,252 | A * | 3/1994 | Becker .......................... | 715/803 |
| 5,651,108 | A * | 7/1997 | Cain et al. ..................... | 715/763 |
| 5,687,331 | A * | 11/1997 | Volk et al. ...................... | 715/840 |
| 5,862,395 | A * | 1/1999 | Bier ................................ | 712/1 |
| 6,031,529 | A * | 2/2000 | Migos et al. ................... | 715/783 |
| 6,111,573 | A * | 8/2000 | McComb et al. .............. | 715/763 |
| 6,137,487 | A * | 10/2000 | Mantha .......................... | 715/767 |
| 6,456,305 | B1 * | 9/2002 | Qureshi et al. ................ | 715/800 |
| 6,954,903 | B2 * | 10/2005 | Richard ......................... | 715/760 |
| 7,154,483 | B2 | 12/2006 | Kobayashi | |
| 7,206,647 | B2 | 4/2007 | Kumar | |
| 7,380,210 | B2 * | 5/2008 | Lontka et al. ................. | 715/705 |
| 7,408,538 | B2 | 8/2008 | Hinckley et al. | |
| 8,489,984 | B1 * | 7/2013 | Violet et al. ................... | 715/243 |
| 2001/0020956 | A1 * | 9/2001 | Moir .............................. | 345/765 |
| 2004/0268269 | A1 * | 12/2004 | Breinberg ...................... | 715/851 |

(Continued)

OTHER PUBLICATIONS http://support.elgato.com/index.php?, "Elgato Systems Technical Support. How Do I Use the On Screen Menu?", 3 pages, printed Dec. 16, 2008.
http://www.microsoft.com/windowsmobile, "Using Tasks Application, Smartphone and PDA, Total Access," 1 page, printed Dec. 16, 2008.

(Continued)

*Primary Examiner* — Rashawn Tillery
(74) *Attorney, Agent, or Firm* — Seager, Tufte & Wickhem LLP

(57) ABSTRACT

A system for configuring objects such as buttons for screens presented in a touch screen display. The configuration may be automatically based on preset styles. The graphical elements or icons and textual elements may be created once but used multiple times in various places. Multiple graphical and textual elements may be displayed on any button of the screens. The system may be based on the use of a predefined set of button styles that define the layout of each textual and graphical element in basic terms, such as left, right, and center. These styles do not necessarily prescribe a size, but a layout of the elements. The sizing, layout, justification, and clipping of each element may be determined by the button style. For each button style, the assigned textual and graphical elements may be automatically placed for the best or optimal layout and fit.

19 Claims, 16 Drawing Sheets

(56) References Cited

U.S. PATENT DOCUMENTS

| | | | |
|---|---|---|---|
| 2006/0136844 A1* | 6/2006 | Zhang et al. | 715/837 |
| 2007/0008343 A1* | 1/2007 | Scheidhauer et al. | 345/636 |
| 2007/0278320 A1* | 12/2007 | Lunacek et al. | 236/94 |
| 2009/0241047 A1* | 9/2009 | Kuwahara et al. | 715/765 |
| 2009/0249193 A1* | 10/2009 | Hanechak | 715/235 |
| 2010/0076605 A1* | 3/2010 | Harrod et al. | 700/276 |
| 2010/0199198 A1* | 8/2010 | Relyea | 715/762 |

OTHER PUBLICATIONS

Cardio Manual, Secant Home Automation Inc., 55 pages, prior to Mar. 25, 2009.

Example of Sort Feature of Microsoft Internet Explorer, 1 page, Created Dec. 16, 2008.

Example of Sort Feature of Microsoft Excel 1 page, Created Dec. 16, 2008.

\* cited by examiner

AUTOMATIC CONFIGURATOR OF DISPLAY OBJECTS

Related patent applications include U.S. patent application Ser. No. 12/411,165, filed Mar. 25, 2009, entitled "MECHANISM FOR INTERFACING A DISPLAY SCREEN OF ANOTHER TECHNOLOGY WITH A COMPUTING PLATFORM"; U.S. patent application Ser. No. 12/411,183, filed Mar. 25, 2009, entitled, "A SMALL SCREEN DISPLAY WITH A DATA FILTERING AND SORTING USER INTERFACE"; U.S. patent application Ser. No. 12/411,193, filed Mar. 25, 2009, entitled "A SYSTEM FOR DEFINING A USER INTERFACE OF A REMOTE DISPLAY DEVICE"; U.S. patent application Ser. No. 12/411,201, filed Mar. 25, 2009, entitled "An APPROACH FOR ADVANCED USER NAVIGATION"; U.S. patent application Ser. No. 12/411,080, filed Mar. 25, 2009, entitled "AN EMBEDDED COMPUTING SYSTEM USER INTERFACE EMULATED ON A SEPARATE COMPUTING DEVICE"; all of which are hereby incorporated by reference.

BACKGROUND

The invention pertains to objects on a display and to their configuration.

SUMMARY

The invention is an approach for configuring objects such as buttons for screens presented in a touch screen display. The configuration may be automatically based on preset styles. The graphical elements or icons and textual elements may be created once but used multiple times in various places. Multiple graphical and textual elements may be displayed on any button of the screens.

DESCRIPTION

Figure 1:
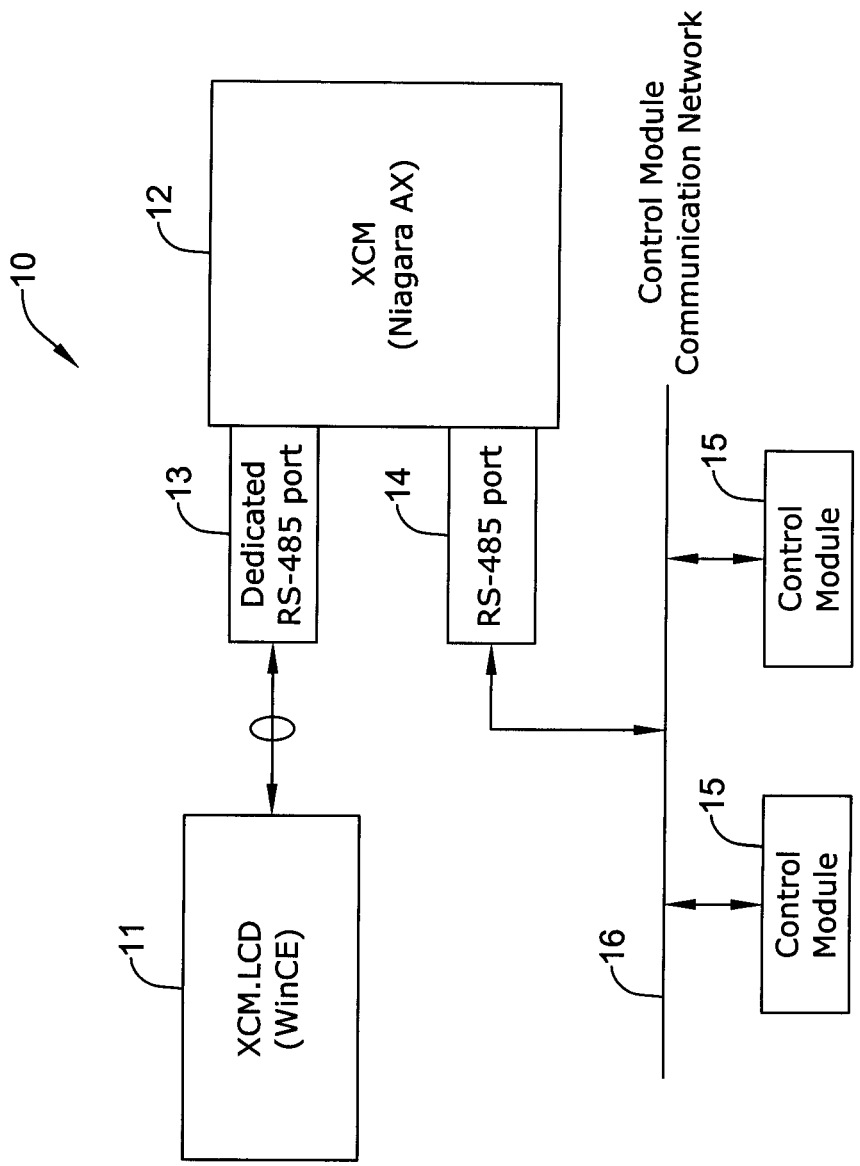
FIG. 1 is a diagram of a basic layout of a system that the present configurator may be associated.

The present invention may be applied to screens of a display of for example a building automation or control system. A basic layout of an example system 10 is shown in FIG. 1. The display is a part of a compact interface 11. Interface 11 may be connected to a NiagaraAX 12 via a dedicated RS-485 port 13. The connection between interface 11 and NiagaraAX 12 may provide high speed serial protocol communications with CRC checking for data integrity. NiagaraAX may also have another RS-485 port 14 be connected to control modules 15 via a network 16.

When programming a graphical user interface display device, such as a touch-screen, a layout of the controls (buttons) on the display is typically up to a programmer, and the text and graphic elements contained in each button need to be manually positioned to fit the buttons. This may be done in a programming language, such as C or Java. Typically, the size of graphical elements needs to be determined and the graphics then created specifically to fit the layout. This seems inflexible and time-consuming, requiring a new graphic to be created for each size of an element. Also, the position and spacing of text elements on each button need also to be manually determined. Even when using a modern graphical user interface tool, the layouts appear tedious to design. Another related issue is that user interface libraries typically allow only one textual element on a button, possibly with a graphical background.

The present approach overcomes such issues with the following features, which may include 1) an automatic layout of button contents based on preset styles, 2) graphical elements (icons) created once and used anywhere, and 3) multiple textual and graphical elements displayed on each button.

The present approach may be based on the use of a predefined set of button styles that define the layout of each textual and graphical element in basic terms, such as left, right, and center. These styles do not necessarily prescribe a size, but a layout of the elements. The sizing, layout, justification, and clipping of each element may be determined by the button style, and thus the user does not necessarily need to be concerned with such details. For each button style, the assigned textual and graphical elements may be automatically placed for the best or optimal layout and fit.

Figure 2:
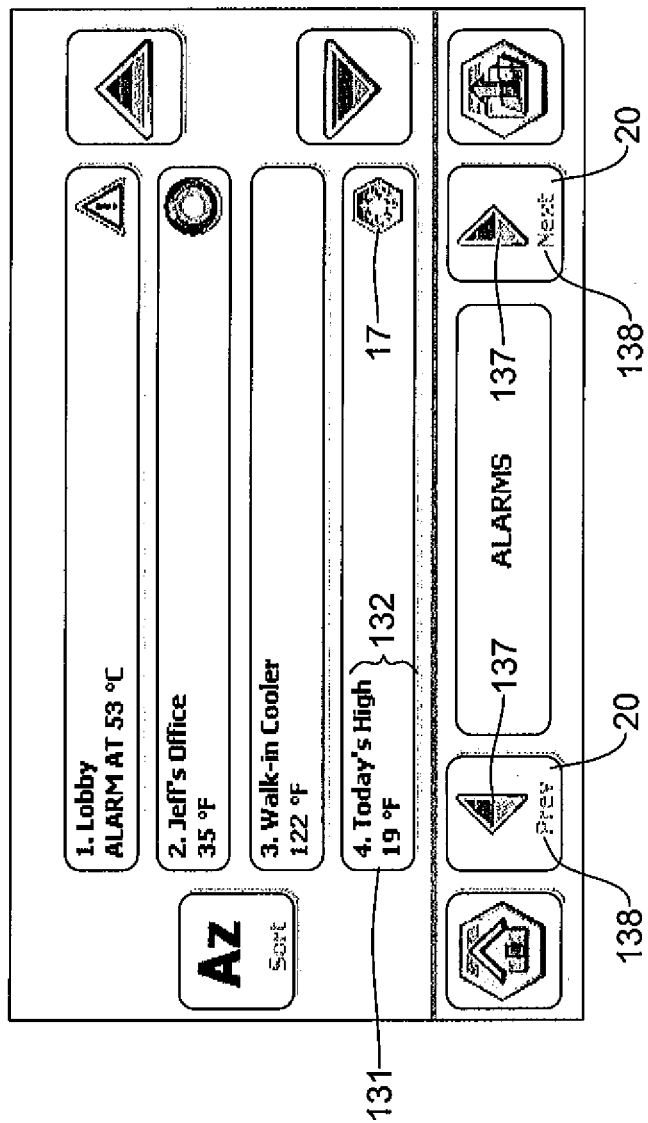
FIGS. 2 and 3 show example of buttons on a screen.
Figure 3:
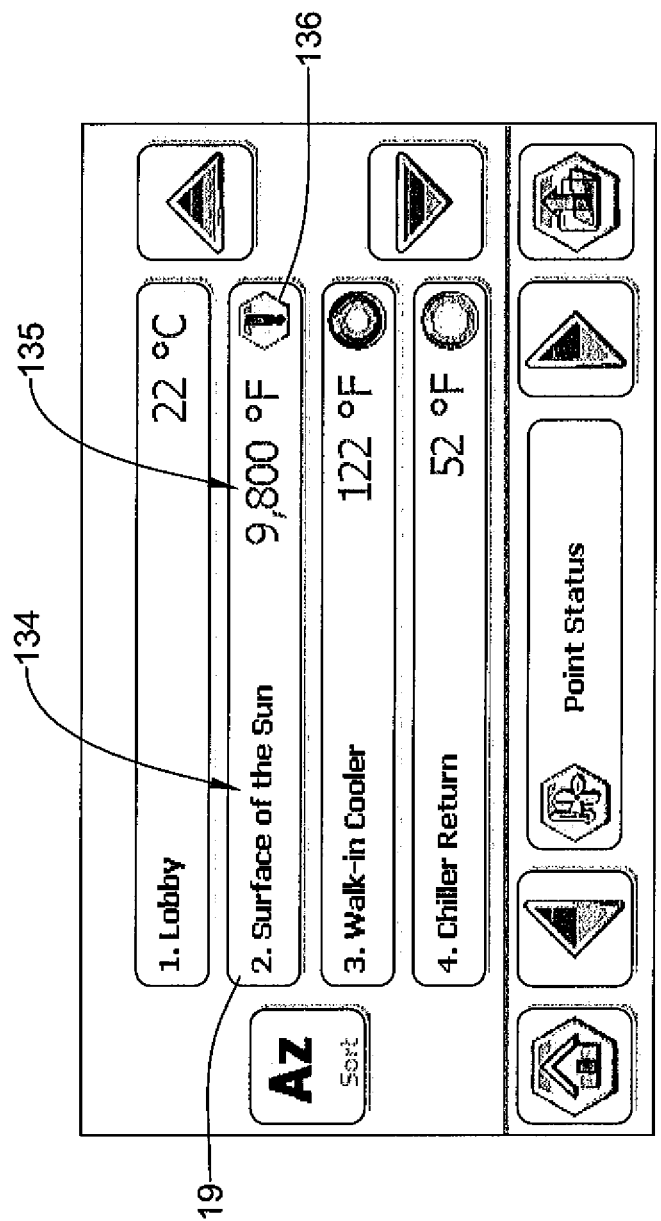
Figure 4:
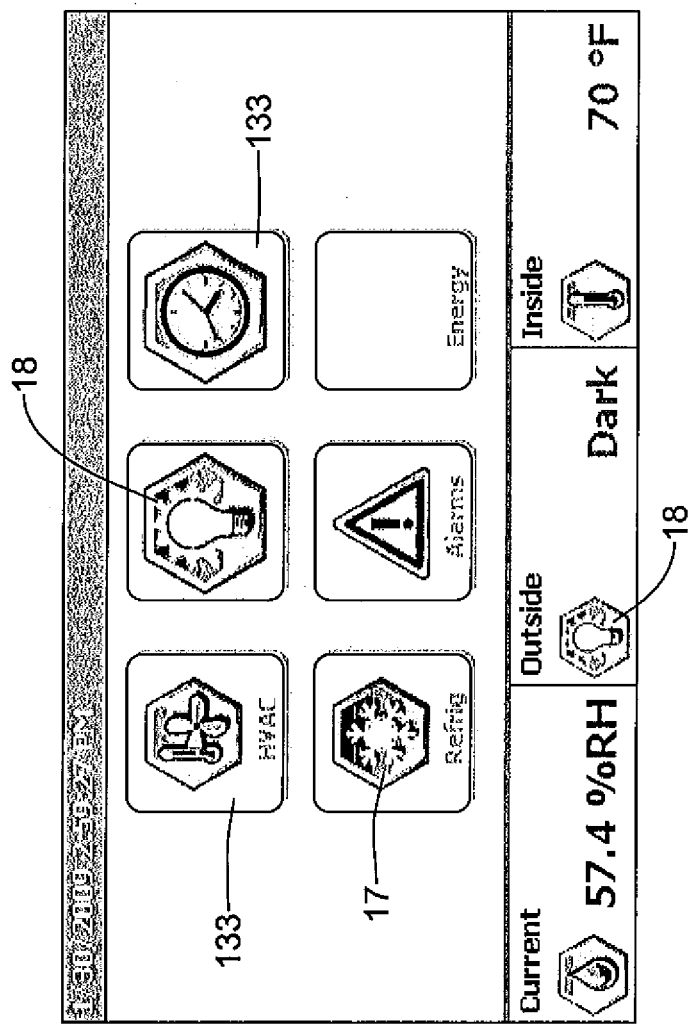
FIG. 4 is an example of a home screen.

When a button containing a graphical element is positioned and sized, the icon file may be read and the image be automatically resized to fit the available space. This may allow an icon to be created once and used with any button style or size. Such approach is illustrated in FIGS. 2 and 4, with the snowflake icons 17, and in FIG. 4 where the light bulb icon 18 is used in two places. FIG. 4 may be an example of the home screen or home page. FIG. 2 may be at a higher level and a result of pressing the "Alarms" on the home screen. FIG. 3 may be one or more levels higher than the refrig screen which may be obtained by pressing the "Refrig" button on the home screen.

For each button style, for a particular instance, there may be up to three textual elements and one graphical element available to be displayed. Each textual element may have separate settings for font style, size, and color. Each graphical element may have two entries, one for a "raised" appearance, and one for a "pressed" appearance. Elements may be optional. There may be additional textual elements and graphical elements available to be displayed for certain button styles. A textual element may have additional settings other than those indicated herein. A graphical element may have additional entries other than those indicated herein.

In the attached file, some of the button styles such as "AlarmListButton", "SquareButton" and "HomePageStatusButton" may be illustrated with the following examples. In FIG. 2, the wide "AlarmListButton" style button 131 may contain two rows of text 132 and an icon 17. In FIG. 4, the "SquareButton" style is used in a larger form which may be used for "Home Page" buttons 133. The "SquareButton" style may be used in several places with various label, text, and icon elements. In FIG. 4, the button of the display shows the "HomePageStatusButton" style, which shows another style of positioning the elements. All of these styles may be built on a common base object, so that appearance and behavior are consistent.

The present approach may be implemented in the Panorama™ project using the C# programming language in Microsoft Visual Studio.NET. A set of predefined button styles may be created and used as a "library" of selections. These styles may be used in a product by a using a graphical or text-based tool to select the style and create instances of it for use on a display device, such as a touch-screen.

To use these buttons, the needed styles are selected for the application, and the size and position are determined for the best layout on a display. When the buttons are instantiated in a program code, the elements assigned to the buttons may automatically be positioned and clipped (or sized) or the best or optimal fit for the chosen style. For example, in FIG. 3, the wide buttons 19 in the center have two text elements 134 and 135, with one placed at the left and one at the right. They may be clipped so that there is no overlap, and that the position of the text element 135 on the right will adapt to the presence of an optional icon 136. For an illustrative example, if a text element 138 called a "Label" is specified, it may "automatically" be positioned at the bottom center. This is shown in the "Prev" and "Next" buttons 20 of FIG. 2. An icon 137 may be automatically sized to fit in the remaining space above the label 138.

Figure 5A:
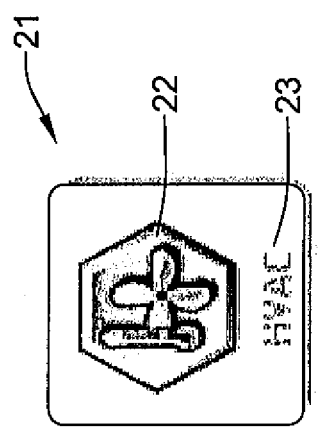
FIGS. 5a and 5b are examples of a square button.
Figure 5B:
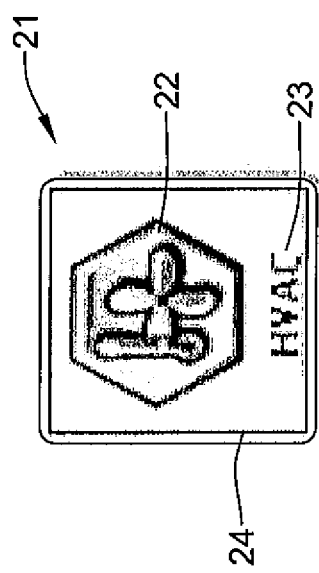
Figure 6:
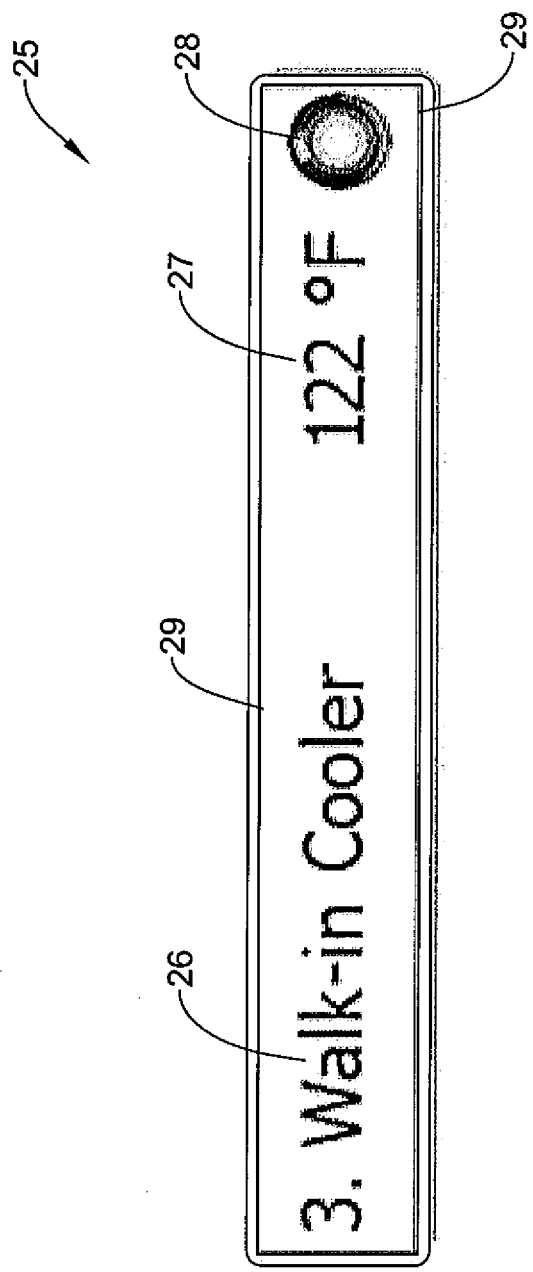
FIG. 6 is a diagram of a point display button.

FIGS. 5a, 5b and 6 a configuration approach for two of the button types described herein—the SquareButton 21 and the PointDisplayButton 25. The FIGS. 5a, 5b and 6 show examples of the buttons 21 and 25, including their FaceRect elements 24 and 29, respectively, which are hidden in application. A FaceRect (face rectangle) element may be a rectangular outline for the face of a button. FIG. 5a shows a square button 21 showing a raised icon 22 and label element 23. FIG. 5b shows the same square button with a FaceRect 24 made visible. FIG. 6 is a diagram of a point display button 25 showing left text 26, right text 27 and a raised icon 28, with the FaceRect 29 visible. The FaceRect represents or is the optimal drawing surface or layout area on the face of the respective button, regardless of size or shape of the button, or the radius of the rounded corners of the button. Features, items and elements relating to the automatic layout and configuring may be based on working within the FaceRect.

Figure 7:
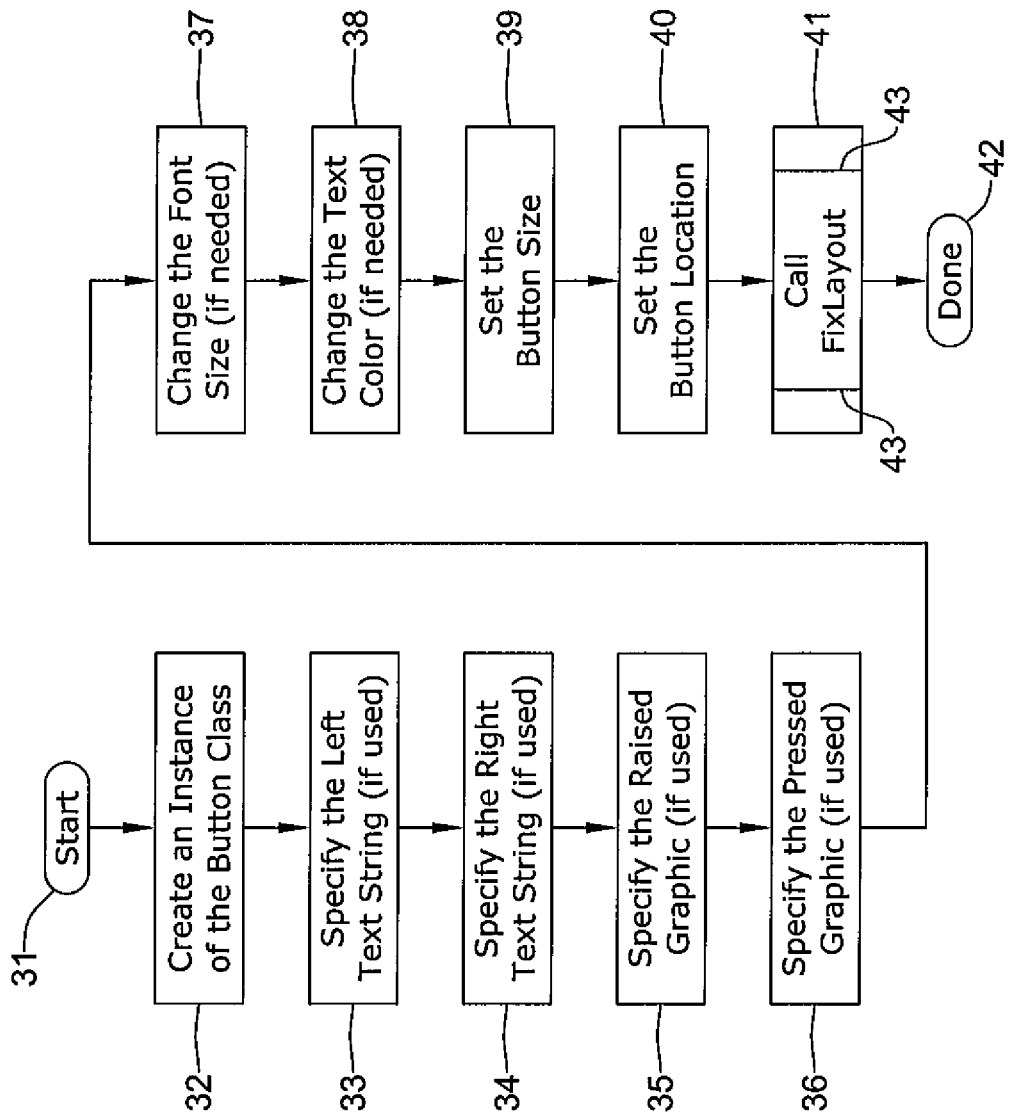
FIG. 7 is a high level diagram for making a button.
Figure 8:
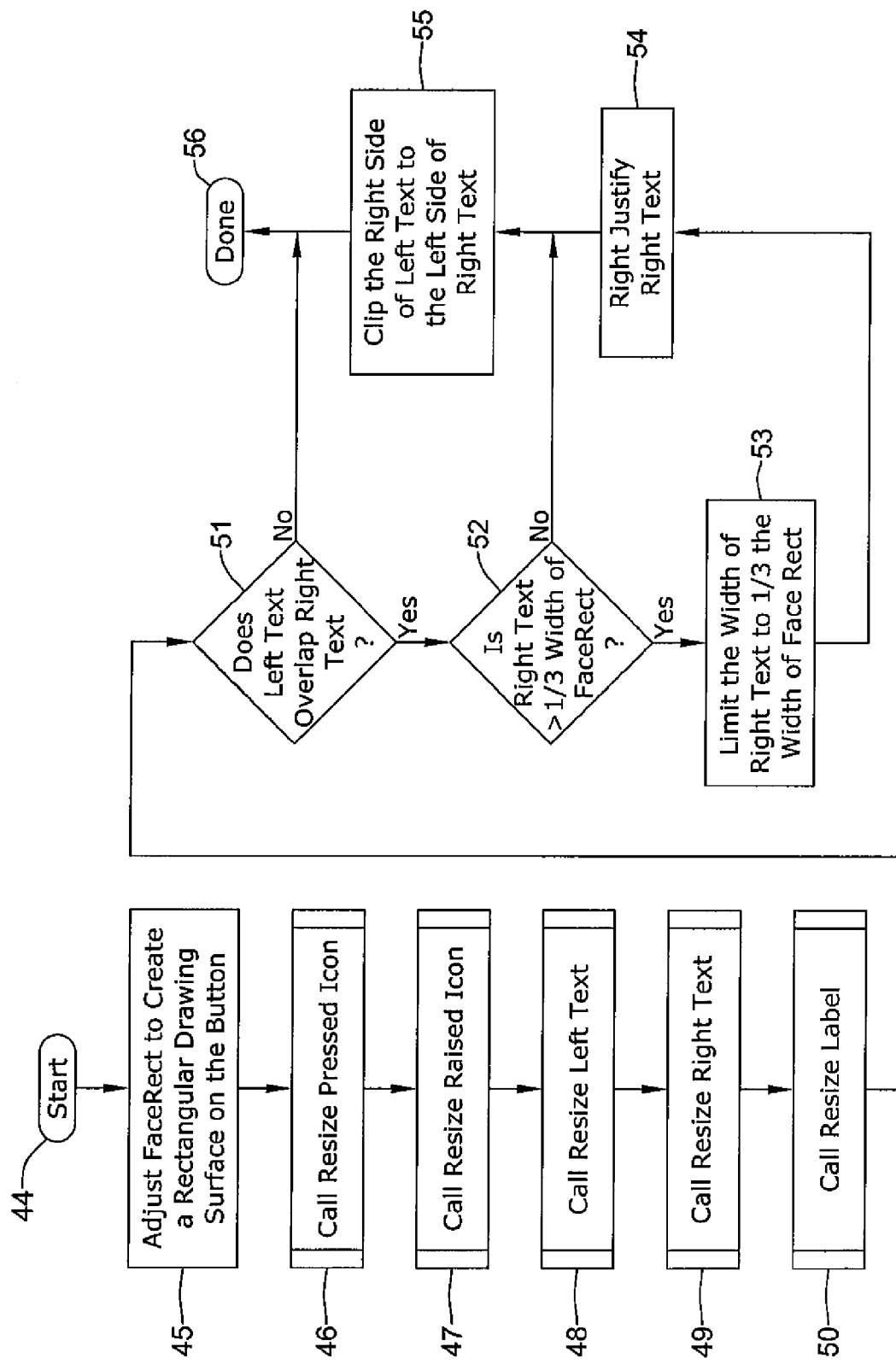
FIG. 8 is a fix lay out diagram for making a button having a flow of function calls that handle sizing, clipping and arranging.

FIGS. 7 through 16 are diagrams of the approaches for sizing, clipping and arranging the elements on the button faces. A high level view in FIG. 7 is the creating a button. The button may be created, and the text and graphical elements are added. Then, a FixLayout approach may be for arranging the display of the button. A FixLayout diagram of FIG. 8 is for the PointDisplayButton type, and shows the flow of function calls that handle sizing, clipping and arranging. FIGS. 9 through 13 show the steps for arranging the individual elements. These Figures also show the differences for handling graphics in two of the button types, and show how the details are hidden from the higher level functions.

Figure 14:
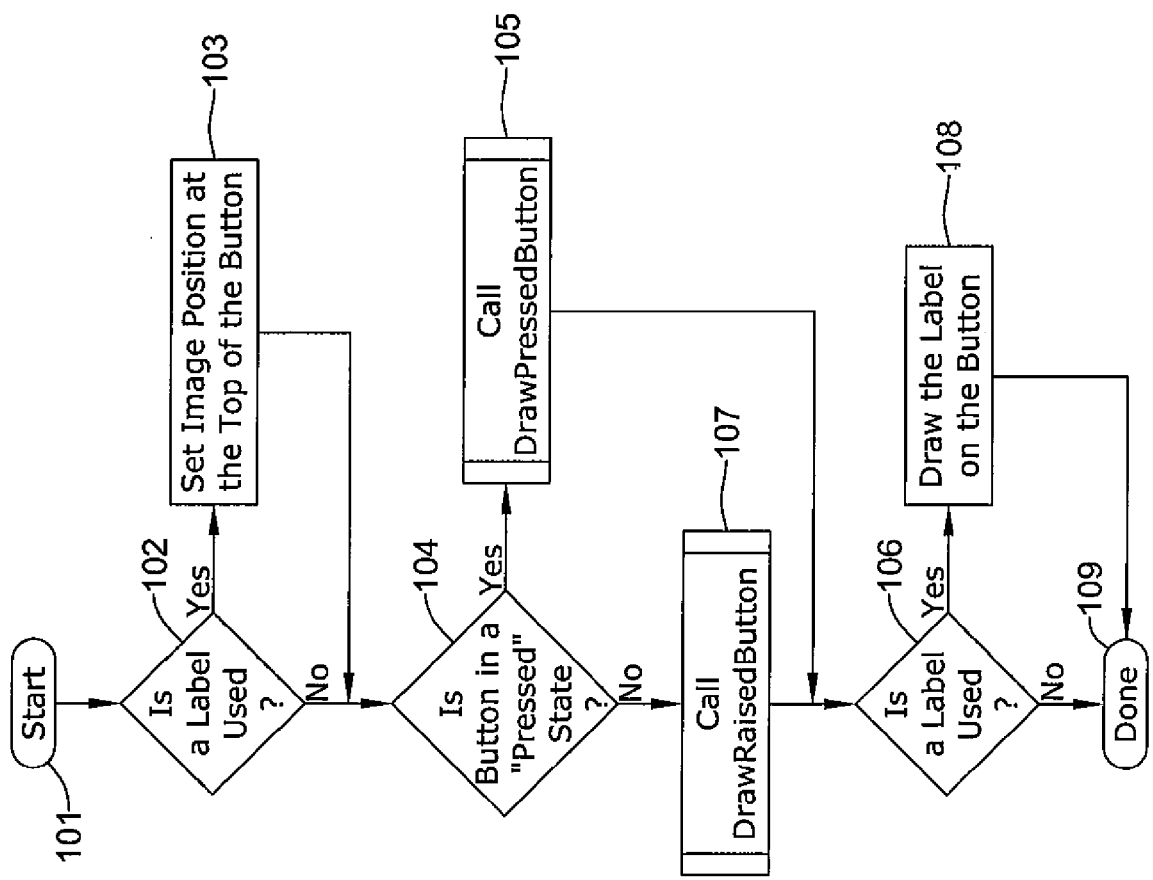
FIG. 14 shows steps for drawing buttons for a display.

FIG. 14 shows steps for drawing the buttons on the display. The diagram outlines steps performed in the draw raised button approach in FIG. 15 and the draw pressed button approach in FIG. 16. The steps are generally similar, with the details hidden and handled per button type.

The point is to show that any button selected may be created and populated with the same or similar steps, and the selected type can determine the steps taken for sizing, clipping and arranging, with no need for the programmer to deal with the details. The flowcharts in FIGS. 7-16 also show how multiple text and graphical elements are handled on each button, a feature of the present approach.

The words "image", "graphic", and "RaisedIcon" or "PressedIcon" may be used loosely in various places. However, these words may reference the same graphical elements used on the buttons.

Two button types are noted, the square button and the point display button. FIGS. 5a and 5b show examples of the buttons, including the FaceRect element, which is hidden in the application. The FaceRect represents the optimal drawing surface on the face of the button, regardless of size, shape, or the radius of the rounded corners. Everything about an automatic layout may be based on working within FaceRect.

The processes for sizing, clipping and arranging the elements on the button faces are noted in flow diagrams discussed herein. A high level view diagram in FIG. 7 shows a button created, and the text and graphical elements added. The flow diagram of FIG. 7 shows, in general, a process for creating a button. One may go from a start position 31 to a block or step 32 where an instance of the button class is created. In block 33, the left text string is specified, if used. The right text string, if used, may be specified in block 34. In block 35, the raised graphic, if used, may be specified. The pressed graphic may be specified, if used, in block 36. In block 37, the font sizes (if needed) may be changed. The text color, if needed, may be changed in block 38. The button size may be set in block 39. In block 40, the button location may be set. Then, the FixLayout may be called in block 41. The process may be done at symbol 42.

The FixLayout is called to arrange the display of the button. The vertical lines 43 inside block 41 or other blocks noted herein indicate that another flow diagram expands on that block or step. FIG. 8 is a flow diagram of an approach for a FixLayout function for a point display button. One may go from a start symbol 44 to a block 45 to adjust FaceRect to create a rectangular drawing surface on the button. Block 46 may be a call for resize a pressed icon. Block 47 may be a call for resize a raised icon. A call for resize left text may be in block 48. In the following block 49, there may be a call for resize right text. A call for resize label may be in block 50. A symbol 51, following block 50, may ask does left text overlap right text? If not, then a done at symbol 56 may occur. If so, then one may go to symbol 52 which ask whether right text is greater than one-third the width of the FaceRect. If not, the one may go to block 55 where clip the right side of left text to the left side of right text. If so, then block 53 follows where limit the width of right text to one-third the width of FaceRect. In block 54, right justify right text, and in block 55, clip the right side of left text to the left side of right text. From block 55, the FixLayout may be done at symbol 56.

Figure 9:
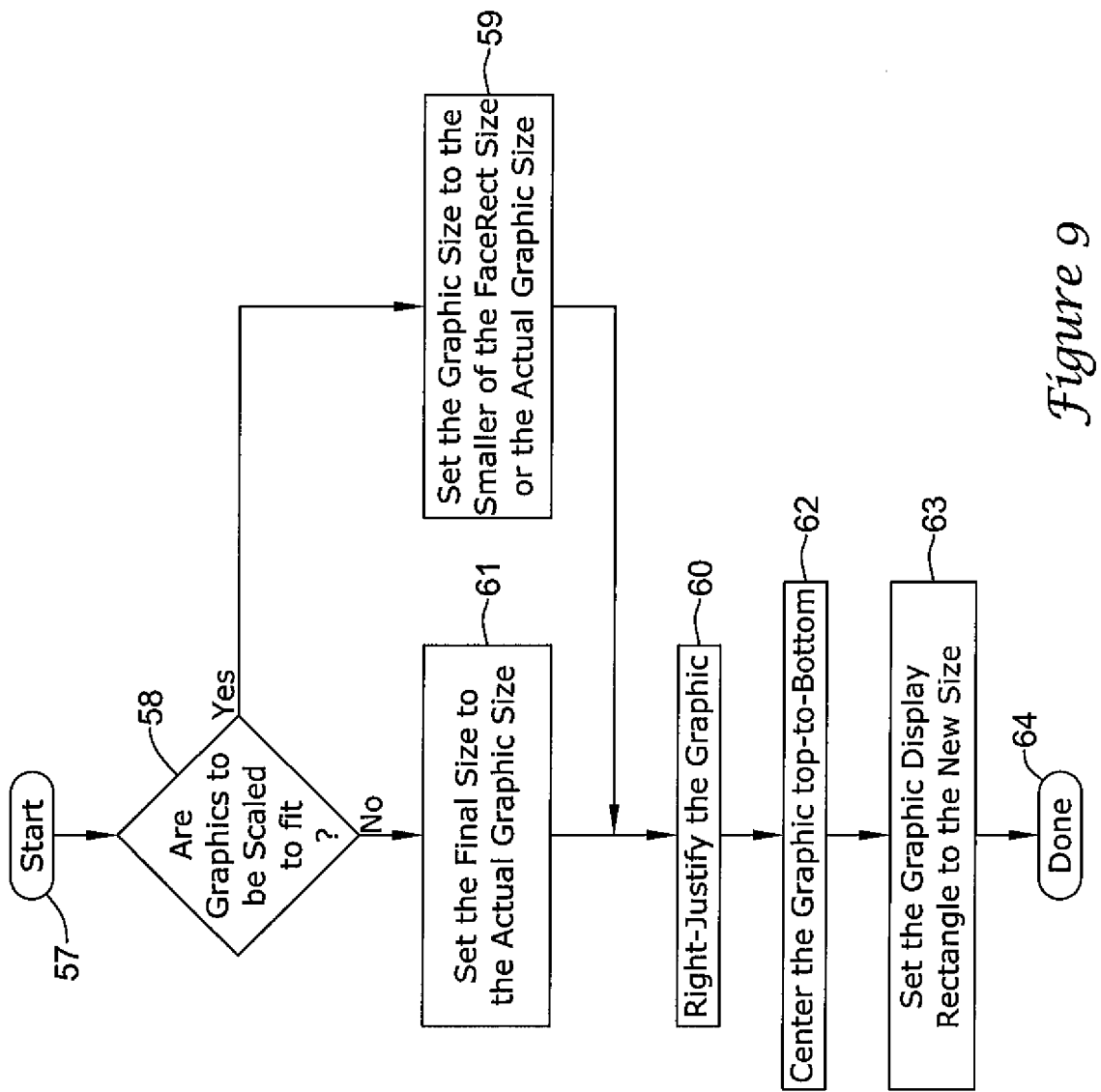
FIGS. 9 through 13 show steps of the function calls in FIG. 8.

FIG. 9 is a diagram of the call of block 46 in FIG. 8. The FIG. 9 diagram is for resize and position a graphic to fit a point display button. The approach in this diagram may be used for both the resize pressed icon and the resize raised icon. The diagram may start at symbol 57 and go to symbol 58 where asked are graphics to be scaled to fit? If so, then in block 59, the graphic size is set to the smaller of the FaceRect size or the actual graphic size. From block 59, one may go to block 60 which says right-justify the graphic. If the answer to the question in symbol 58 is no, then block 61 follows where the final size to the actual graphic size is set. On to block 60, the graphic may be right-justified. In block 62, the graphic may be centered top-to-bottom. The graphic display rectangle may be set to the new size in block 63. The diagram may be done at symbol 64.

Figure 10:
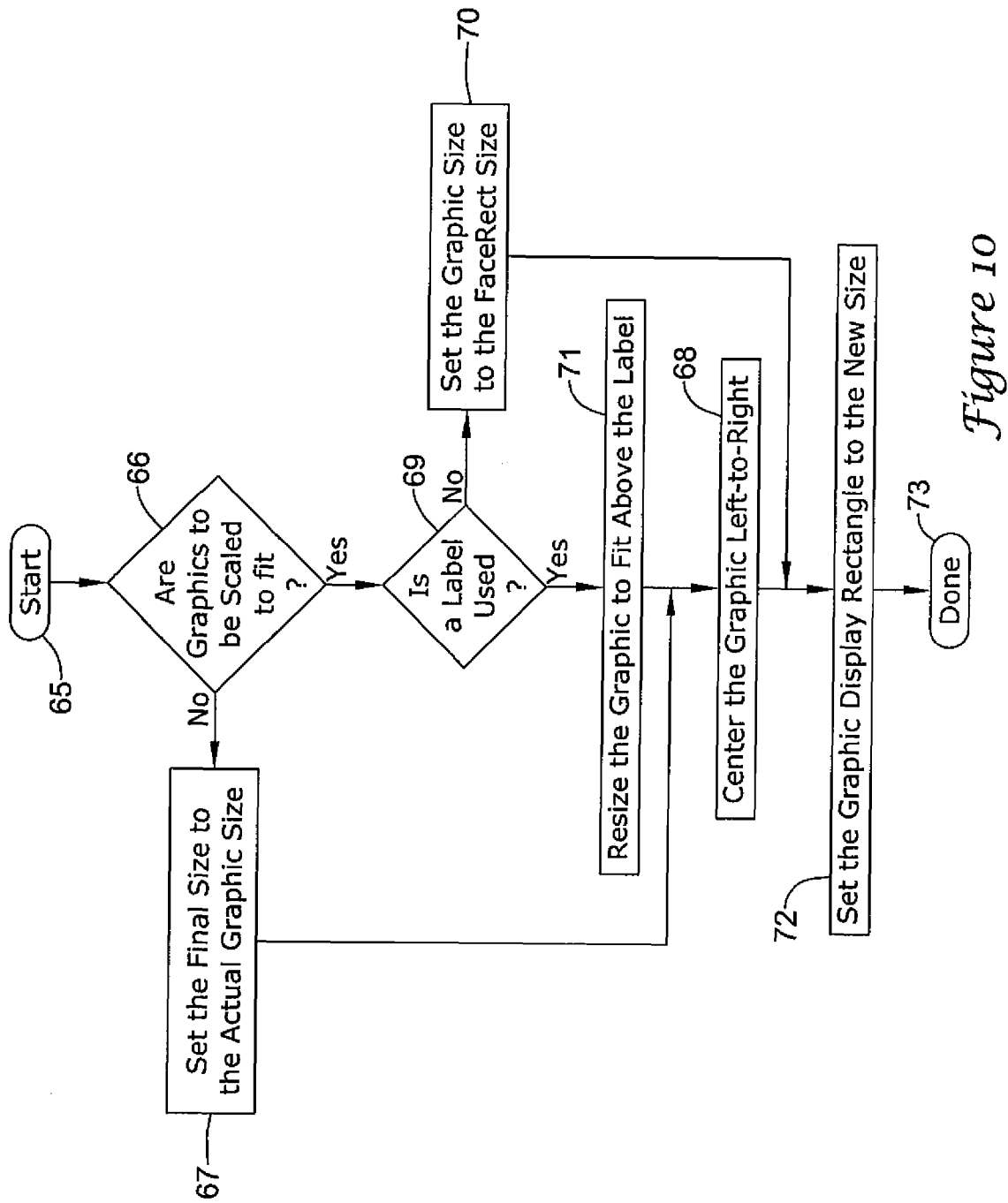

FIG. 10 is a diagram for the call of block 47 in FIG. 8. The FIG. 10 diagram is for resize and position of a graphic to fit a square button. This approach may be used for both resize pressed icon and resize raised icon. From a start symbol 65, one may go to a symbol 66 which asks are graphics to be scaled to fit. If not, block 67 may set the final size to the actual graphic size, and then one may go to block 68 to center the graphic left-to-right. If the answer to the question of symbol 66 is yes, then a symbol 69 may ask if a label is used. If not, then go to block 70 to set the graphic size to the FaceRect size. If yes, then go to block 71 to resize the graphic to fit above the label. After block 71, center the graphic left-to-right in block 68. Subsequently, the graphic display rectangle may be set to the new size. This approach may be done at symbol 73.

Figure 11:
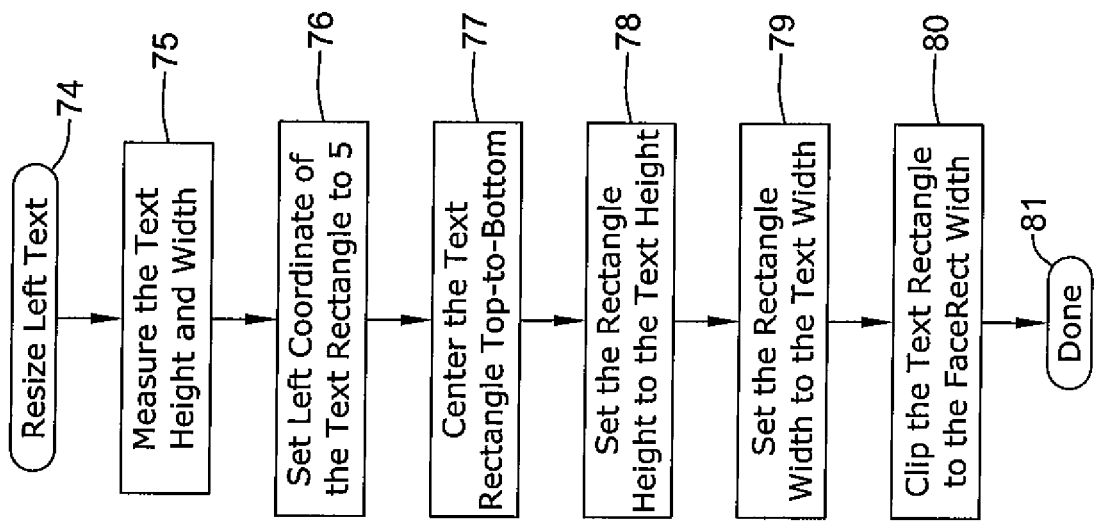

FIG. 11 is a diagram for the call of block 48. The diagram of FIG. 11 shows an approach to resize and position the left text to fit a point display button. Resize left text may be indicated in symbol 74. The text height and width may be measured in block 75. In block 76, the left coordinate of the text rectangle may be set to 5. Then in block 77, the text rectangle may be centered from top-to-bottom. The rectangle height may be set to the text height in block 78. Then, the rectangle width may be set to the text width in block 79. The text rectangle may be clipped to the FaceRect width in block 80. This approach may be done at symbol 81.

Figure 12:
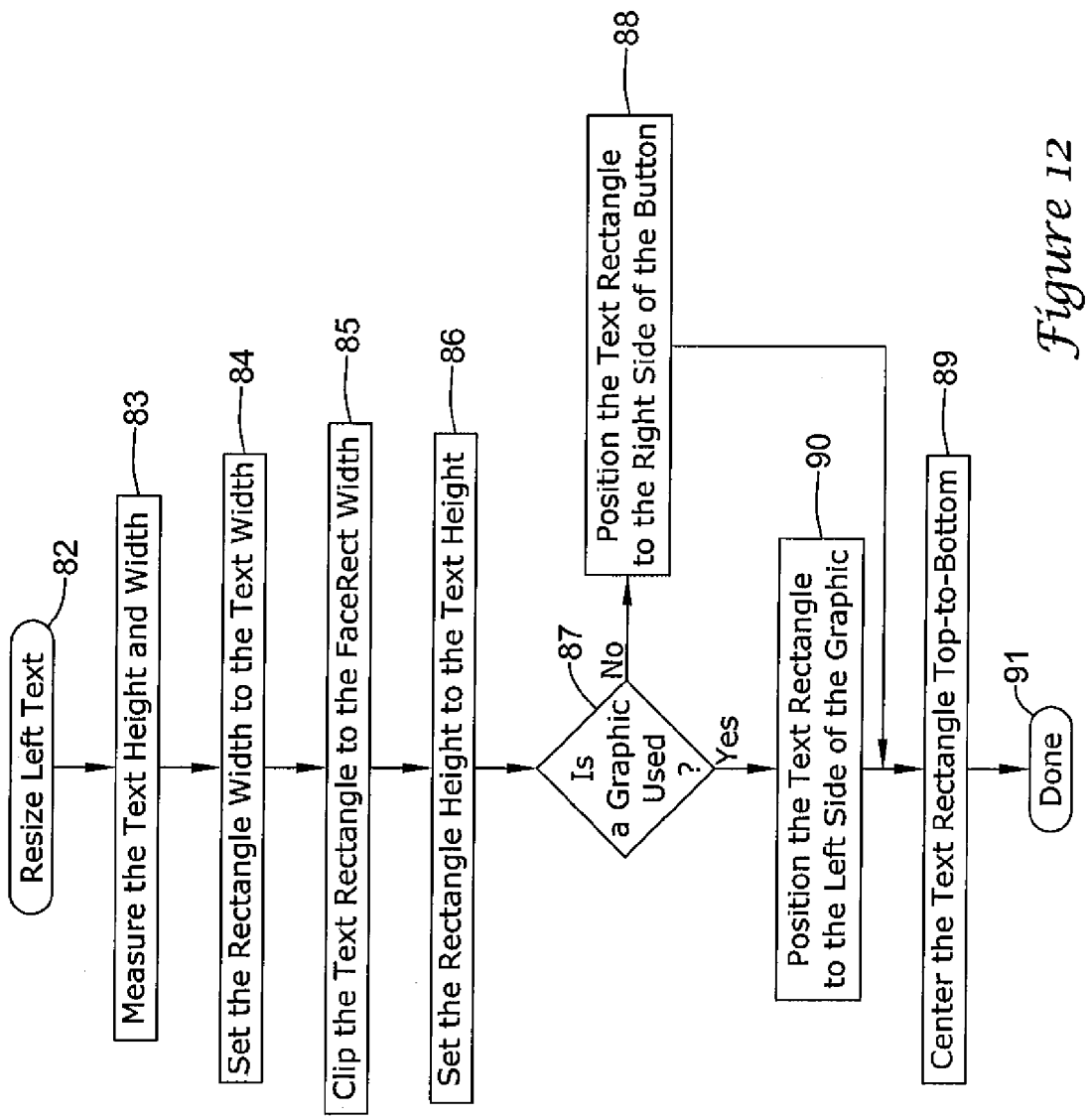

FIG. 12 is a diagram for the call of block 49 of FIG. 8. The diagram of FIG. 12 shows an approach to resize the position the right text to fit a point display button. Resize right text may be indicated in symbol 82. In block 83, the text height and width may be measured. The rectangle width may be set to the text width in block 84. In the next block 85, the text rectangle may be clipped to the FaceRect width. Block 86 indicates the rectangle height to be set to the text rectangle. At symbol 87, following block 86, a question as to whether a graphic was used may be asked. If not, then the text rectangle may be positioned to the right side of the button in block 88. From block 88, one may go to block 89 to center the text rectangle top-to-bottom. If a graphic was used in symbol 87, then the text rectangle may be positioned to the left side of the graphic in block 90. Then the text rectangle may be centered top-to-bottom in block 89. The approach may be done at symbol 91.

Figure 13:
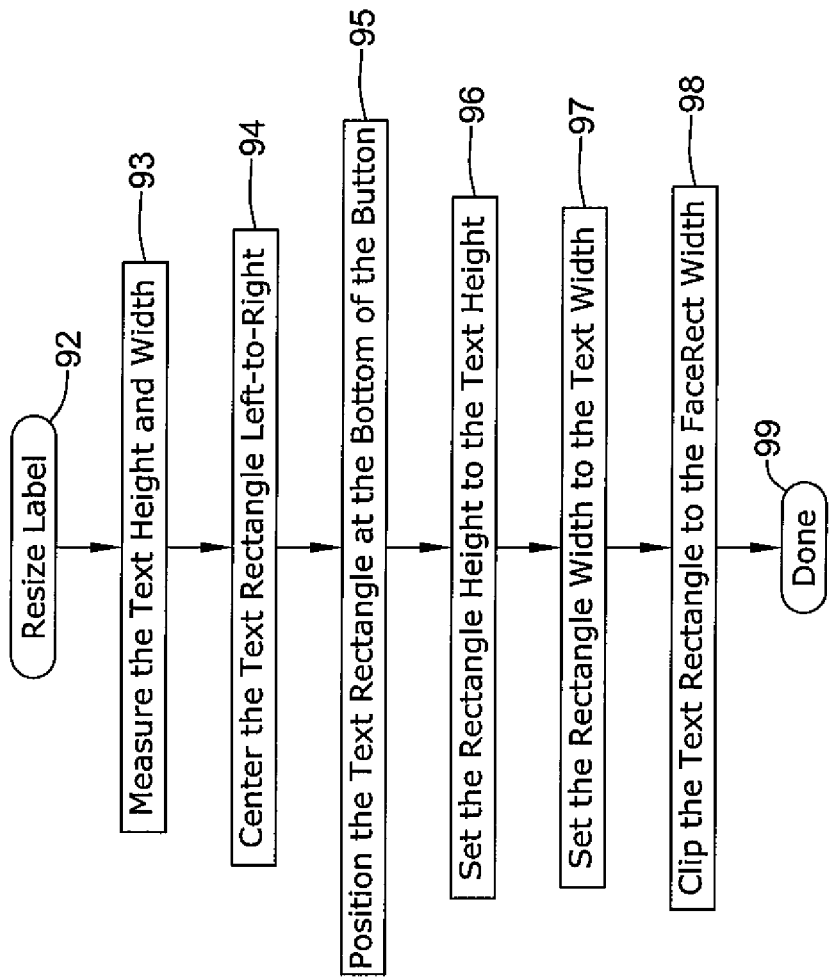

FIG. 13 is a diagram for the call of block 50 of FIG. 8. The diagram of FIG. 13 shows an approach to resize and position the label to fit a square button. Resize label in symbol 92. In block 93, the text height and width may be measured. Then in block 94, the text rectangle may be centered left-to-right. The text rectangle may be positioned at the bottom of the button according to block 95. At block 96, the rectangle height may then be set to the text height. The rectangle width may be set to the text width in block 97. Then the text rectangle may be clipped to the FaceRect width in block 98. The approach may be done at symbol 99.

FIG. 14 is a diagram of an approach for drawing buttons which may start at symbol 101. A question is whether a label is used may be asked at symbol 102. If the answer is yes, then the image position may be set at the top of the button in block 103. After block 103, one may go to symbol 104 which asks whether the button is in a "pressed" state. If the answer to the question in symbol 102 is no, then one may go to symbol 104. If the answer to the question in symbol 104 is yes, then one may go to a block 105 for a call for a draw pressed button. From block 105, one may go to a symbol 106 which asks whether a label is used. If the answer to the question in symbol 104 is no, then one may go to a block 107 for a call for a draw raised button. After block 107, one may go to symbol 106. If an answer to the question in symbol 106 is yes, then the label may be drawn on the button as indicated in block 108. After block 108, then the approach may be done as indicated by symbol 109. If the answer to the question in symbol 106 is no, then the approach may be done as indicated in symbol 109.

Figure 15:
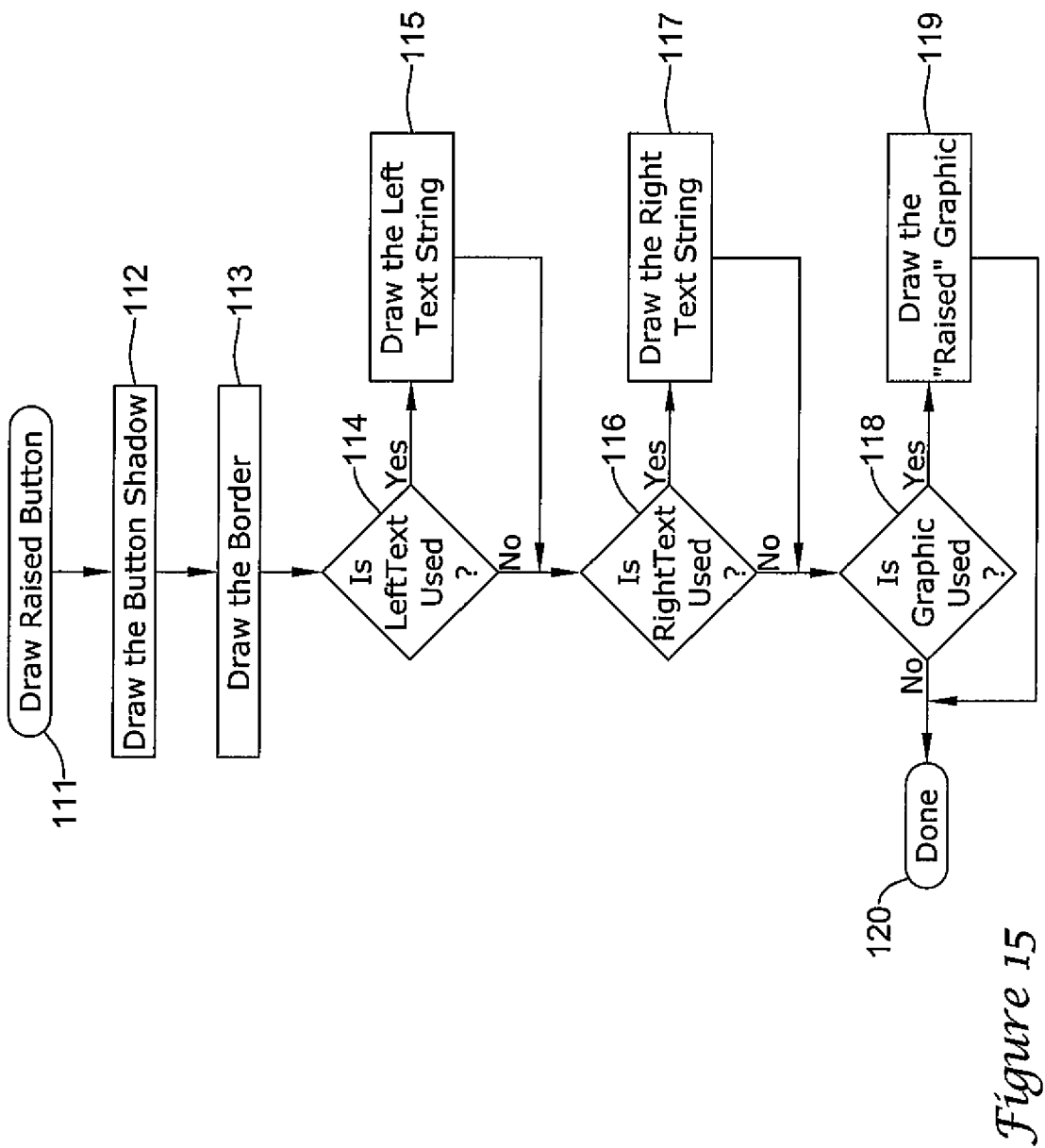
FIG. 15 is a diagram outlining steps performed in a draw raised button approach.

FIG. 15 is a diagram of the call in block 107 of FIG. 14. An approach for drawing a raised button may start at symbol 111. The button shadow may be drawn at block 112. The border may be drawn at block 113. Then at a symbol 114 is a question of whether left text is used. If yes, then the left text string may be drawn at block 115, and then at a symbol 116 is a question of whether right text is used. If the answer to the question at symbol 114 is no, then one may go to symbol 116. If the answer to the question in symbol 116 is yes, then the right text string may be drawn at clock 117. From block 117 one may go to symbol 118 which asks the question whether the graphic is used. If the answer to the question at symbol 116 is no, then the question at symbol 118 may be asked. If the question at symbol 118 is answered yes, then the raised graphic may be drawn at block 119. After block 119, the process may be done as indicated at symbol 120. If the question at symbol 118 is answered as no, the process may be done as indicated at symbol 120.

Figure 16:
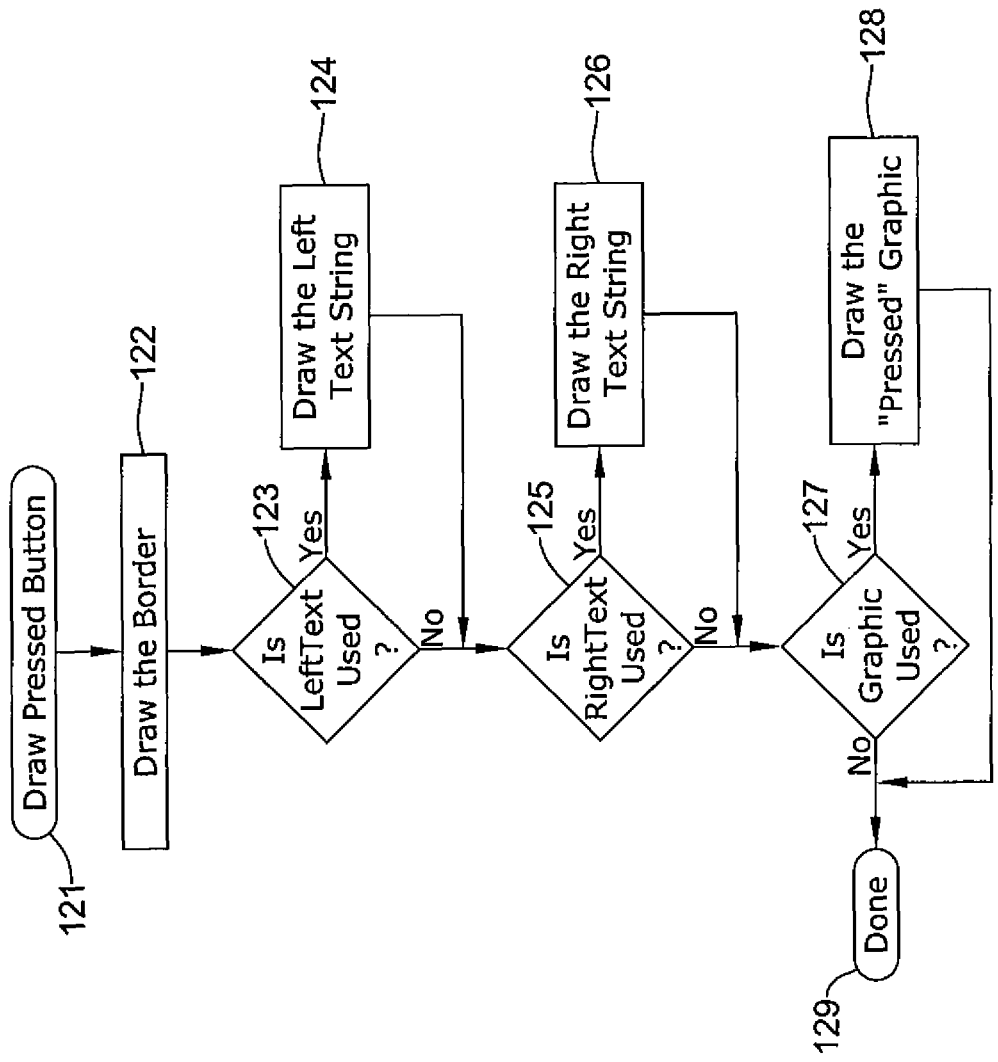
FIG. 16 is a diagram outlining steps performed in a draw pressed button approach.

FIG. 16 is a diagram of the call in block 105 of FIG. 14. An approach for drawing a pressed button may start at symbol 121. Then at block 122, a border may be drawn. A question of whether the left text is used may be asked at symbol 123. If the answer is yes, then the left text string may be drawn at block 124. After block 124, a question of whether right text is used, may be asked at symbol 125. If the answer to the question at symbol 123 is no, then the question at symbol 125 may be asked. If the answer is yes, then the right text string may be drawn at block 126. After block 126, a question whether the graphic is used may be asked at symbol 127. If the question at symbol 125 is no, then the question at symbol 127 may be asked. If the answer is yes, then the pressed graphic may be drawn at block 128. After block 128, the process may be done as indicated at symbol 129. If the answer to the question at symbol 127 is no, then the process may be done as indicated at symbol 129.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A method for generating an object for display on a screen for a business automation system comprising an embedded controller, comprising:

displaying an object to be further developed on a screen of an interface of a building automation system, wherein the building automation system comprises an embedded controller and a communications port for sending and/or receiving signals to and from one or more building control modules and wherein the object has a style selected from a set of preset styles that define a layout of each textual and graphical element in basic terms;

wherein the object is further developed by:

defining an optimal layout area on the object, wherein the layout area is defined regardless of the size and/or shape of the object;

setting a size of the object;

specifying a textual element to be displayed at a first predetermined location by the object;

specifying a graphical element to be displayed at a second predetermined location by the object, wherein the graphical element comprises an icon and is displayed separately from the textual element at the second predetermined location; and wherein for each style of the object, automatically placing the textual element at the first predetermined location within the layout area based on the style and size of the object and resizing the textual element to fit within the first predetermined location;

automatically placing the graphical element at the second predetermined location within the layout area based on the style of the object and the size and the location of the textual element, the graphical element being automatically re-sized to fit within the available space at the second predetermined location.

2. The method of claim 1, further comprising setting a location on a screen for the object.

3. The method of claim 1, further comprising re-setting the object size as needed for placement of the object on a screen.

4. The method of claim 1, wherein the graphical element can be specified again for an object.

5. The method of claim 1, wherein the textual element can be specified again for an object.

6. The method of claim 1, further comprising:
selecting a raised or pressed style for the graphical element; and
selecting font style, color and size for the textual element.

7. The method of claim 1, wherein the available space on the object is indicated by a face rectangle element.

8. The method of claim 7, wherein if a graphical element on the object is removed, added, or changed in size, the other one or more textual and/or graphical elements, if any, are automatically and optimally positioned and sized to fit within the available space on the object.

9. The method of claim 8, further comprising providing a program for automatic placement of specified textual and graphical elements for a best fit within the available space on the object, and for automatic positioning and sizing the textual and graphical elements to fit optimally within the available space on the object.

10. The method of claim 9, wherein the object is a button, and wherein the first location is adjacent to the second location within the layout area and wherein the graphical element is sized to be the same width as the textual object and to fit within the available space in the layout area.

11. A building automation system comprising:
an embedded controller, at least one communications port for sending and/or receiving signals to and from one or more building control modules, a graphical user interface having a touch screen display and a processor, the processor comprising an automatic display object configurator configured to generate and display an object, the configurator comprising:
a set of predefined styles for a button;
a tool for providing a button having a first size for display on the touch screen display, the button having a style selected from the set of pre-defined styles;
two or more elements situated on the button including at least one textual element and at least one graphical element, wherein the at least one graphical element comprises an icon and is situated at a location separate from the textual element;
a second tool for automatically positioning and fitting the at least one textual element within a text rectangle positioned on the button at a first predetermined location and fitting the text within the text rectangle; and
automatically positioning the at least one graphical element adjacent to the text rectangle at a second predetermined location and re-sizing the graphical element to fit within the remaining available space of the button, wherein the at least one textual element and the graphical element are positioned based on the selected style of the button; and wherein:
the button has a size; and
if the size changes then the second tool automatically positions and re-fits the two or more textual elements and the graphical element for an optimal fit based on the selected style and the new size of the button.

12. The system of claim 11, further comprising a face rectangle representing an area on the button for the one or more textual elements and the graphical element situated on the button, wherein the text rectangle is resized to fit within the face rectangle when the size of the button changes.

13. The system of claim 12, wherein the area represented by the face rectangle is provided to the second tool.

14. The system of claim 11, wherein:
a textual element comprises settings for font style, size and color; and
a graphical element comprises an entry for a raised appearance and an entry for a pressed appearance and/or an icon.

15. The system of claim 12, wherein the tools are instantiated in program code.

16. A building control system comprising:
an embedded controller, at least one communications port for sending and/or receiving signals to and from one or more building control module, a user interface having a display including a screen, and a processor, the processor comprising a configurator for generating and configuring an object on the screen of the display of the user interface, the configurator comprising:
a layout mechanism for inserting and arranging one or more graphical elements and two or more textual elements on an object according to a preset style and a selected size of the object on a screen for a display of a building control system; and
a set of preset styles for permitting an automatic arrangement of the one or more graphical elements and the two or more textual elements on the objects; and wherein:
each preset style defines an arrangement of the one or more graphical elements and the two or more textual elements on an object relative to one another, wherein the one or more graphical elements are displayed at a location separate from the location of the two or more textual elements; and
each preset style permits the one or more graphical elements and the two or more textual elements to be automatically sized for a given size of the object, and a size and a location of the one or more graphical elements are dependent upon a size and a location of the two or more textual elements.

17. The system of claim 16, wherein each preset style permits each of the graphical and textual elements to be automatically resized based on another size of the object.

18. The system of claim 16, wherein each of the graphical and textual elements of a preset style is reusable on numerous objects.

19. The system of claim 16, wherein:
the graphical and/or textual elements are placed within a face rectangle element of the object;
the face rectangle element indicates an optimal surface area on the object for graphical and/or textual elements;

a textual element is for placement of messages, description and/or labels;
font style and color of the textual elements are selectable;
a graphical element has a raised or pressed appearance or neither appearance; and
an object is a button.

\* \* \* \* \*